No. 792,850. PATENTED JUNE 20, 1905.
J. RIGBY.
CAR WHEEL.
APPLICATION FILED JUNE 11, 1904.
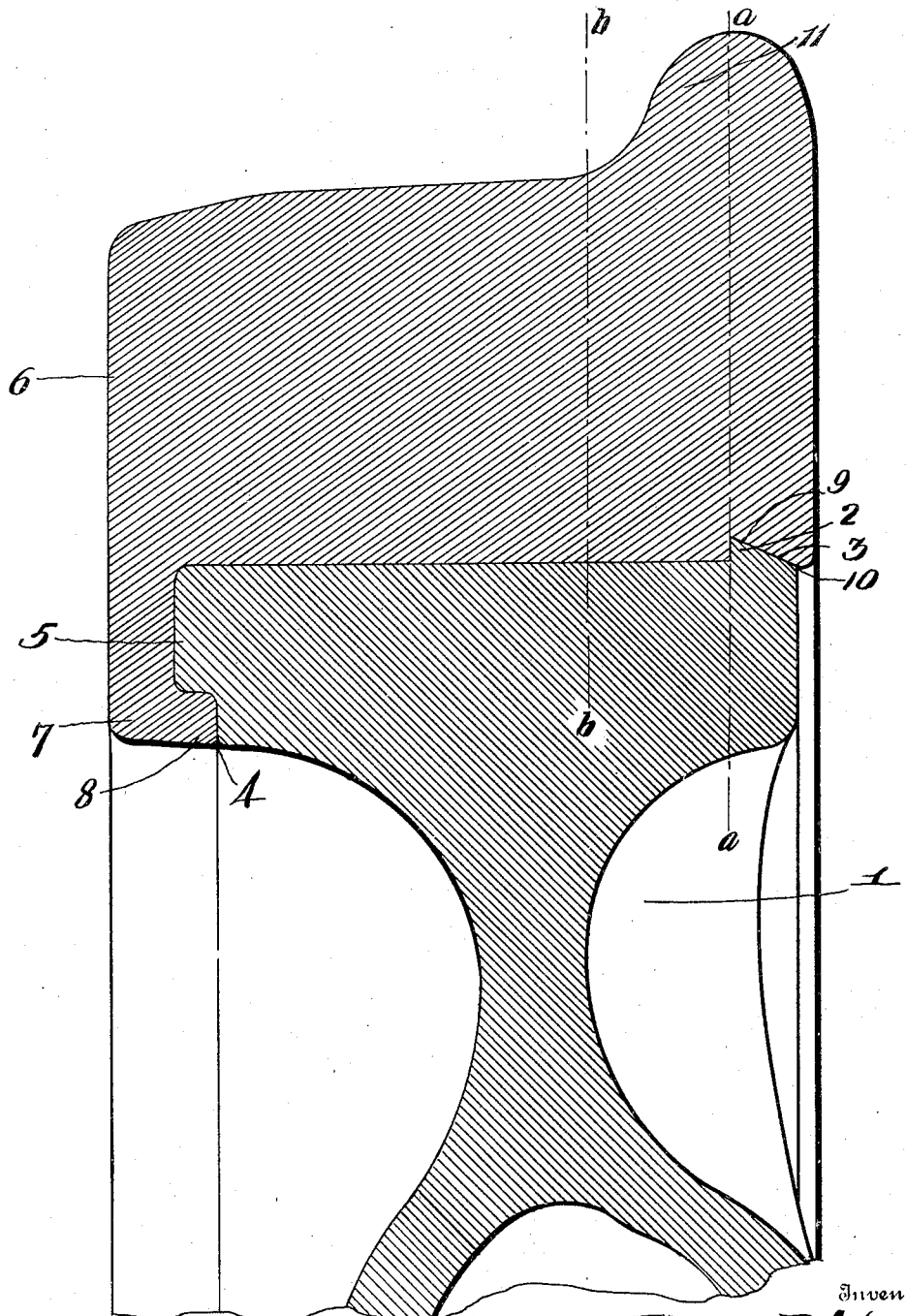

No. 792,850.

Patented June 20, 1905.

UNITED STATES PATENT OFFICE.

JAMES RIGBY, OF NEW YORK, N. Y.

CAR-WHEEL.

SPECIFICATION forming part of Letters Patent No. 792,850, dated June 20, 1905.

Application filed June 11, 1904. Serial No. 212,084.

*To all whom it may concern:*

Be it known that I, JAMES RIGBY, a citizen of the United States, residing at New York, in the county of New York and State of New York, have invented certain new and useful Improvements in Car-Wheels; and I do declare the following to be a full, clear, and exact description of the invention, such as will enable others skilled in the art to which it appertains to make and use the same.

My invention relates to improvements in car-wheels, particularly with reference to locking devices for securing the tire to the web or body of the wheel, the object of my invention being to effect such improvements in the construction of the said locking devices as to increase the durability of the wheel by enabling the same to be used until the tire has been worn to a much greater extent than has been safe in the car-wheels constructed in accordance with the Master Car-Builders' standard rule.

My invention consists in the construction, combination, and arrangement of devices hereinafter described and claimed.

The accompanying drawing is a sectional view of a portion of a car-wheel embodying my improvements.

The web or body 1 of the wheel is provided at its inner side at its rim with an annular outwardly-projecting locking-flange 2, the outer side of which is beveled inwardly, as at 3. On the outer side of the rim of the wheel web or body is an annular recess 4, that portion of the rim between said recess and the face or outer side of the rim forming a flange-head 5.

The tire 6, which is made of steel, is formed on its outer side with an inwardly-extending annular flange 7, the inner edge of which is directed laterally toward the outer or front side of the wheel to form a flange 8. The flange 7 bears against the flange-head of the wheel web or body, and the said flange enters the recess 4 thereof. At the rear side of the tire, on the inner side thereof, is an annular locking groove or recess 9, which conforms in shape with the beveled locking-flange 2 of the wheel web or body to receive the same. Hence the coacting laterally-inclined surfaces 3 and 10, respectively, of the flange 2 and groove or recess 9 constitute, in connection with the flanges 7 8, locking devices, which securely fasten the tire on the rim of the wheel web or body.

When the web and tire are ready to be put together, the tire is heated to the extent required to expand it about one-half inch. The web is then dropped in place in the tire and becomes united thereto by the subsequent shrinking of the tire. For the purposes of this specification the outer side of the wheel is called the "front" side and the inner side of the wheel is called the "rear" side. It will be observed by reference to the drawing that the flange 2 and groove 9 are at the rear side of the wheel and are of less width than the flange 11 thereof, so that said flange 2 and groove 9 are entirely in rear of the tread or working peripheral surface of the tire and are also in rear of the front side or portion of the wheel-flange 11—that is to say, a plane *a a*, coincident with the sides of the flange 2 and groove 9, is in rear of and spaced from the plane *b b*, which is coincident with the front side of the wheel-flange 11. Hence the durability of the wheel is greatly enhanced, because my improved construction enables the tire to be safely worn to a much greater extent than the tires of car-wheels of this class as usually constructed, in which the coacting locking rear flange and groove are of a width equal to or in excess of that of the peripheral wheel-flange.

Having thus described my invention, what I claim as new, and desire to secure by Letters Patent, is—

1. A car-wheel comprising a web or body, and a tire having coacting locking devices on the front side of the wheel, one of said members having an annular flange and the other having an annular groove engaged by said flange, said flange and groove being at the rear side of the wheel and of less width than the peripheral flange of the wheel, so that a plane coincident with the front side of the said coacting flange and groove is entirely in rear of and spaced from a plane coincident with the front side of the peripheral flange of the wheel, for the purpose set forth.

2. A car-wheel comprising a web or body, and a tire having a coacting locking device on the front or outer side of the wheel, said web or body having an annular flange projecting from its rim at the inner side of said web or body, said annular flange being downwardly beveled, and a tire having a corresponding recess or groove receiving said beveled flange, said flange and groove being at the rear side of the wheel and of less width than the peripheral flange of the wheel, so that a plane coincident with the front sides of said coacting flange and groove is entirely in rear of and spaced from a plane coincident with the front side of the peripheral flange of the wheel, for the purpose set forth.

In testimony whereof I have hereunto set my hand in presence of two subscribing witnesses.

JAMES RIGBY.

Witnesses:
 EMMA HUSSUNG,
 JACOB J. ARNOLD.